(12) United States Patent
Maillard et al.

(10) Patent No.: US 7,771,177 B2
(45) Date of Patent: Aug. 10, 2010

(54) VENTILATION ASSEMBLY HAVING A COLLAR FOR THE RADIAL CLAMPING OF THE FAN MOTOR, CORRESPONDING COOLING MODULE FOR THE FRONT UNIT, AND CORRESPONDING MOTOR VEHICLE

(75) Inventors: Jérôme Maillard, Chamesol (FR); Eric Texier, Mandeure (FR); David Negre, Seloncourt (FR); Bruno Lucbernet, Seloncourt (FR)

(73) Assignee: Faurecia Cooling Systems, Nanterre (FR)

( * ) Notice: Subject to any disclaimer, the term of this patent is extended or adjusted under 35 U.S.C. 154(b) by 1733 days.

(21) Appl. No.: 10/799,591

(22) Filed: Mar. 15, 2004

(65) Prior Publication Data

US 2004/0208757 A1    Oct. 21, 2004

(30) Foreign Application Priority Data

Mar. 14, 2003  (FR) .................................. 03 03190

(51) Int. Cl.
*F04B 17/03* (2006.01)
(52) U.S. Cl. ................................. 417/423.15; 417/363
(58) Field of Classification Search ............ 417/423.15, 417/363
See application file for complete search history.

(56) References Cited

U.S. PATENT DOCUMENTS

| 4,335,646 | A | * | 6/1982 | Jacquet et al. ............... 454/159 |
| 5,275,538 | A | * | 1/1994 | Paliwoda et al. ............ 417/314 |
| 5,492,456 | A | | 2/1996 | Knight et al. |
| 6,158,979 | A | * | 12/2000 | Couetoux et al. ........... 417/360 |
| 6,386,845 | B1 | * | 5/2002 | Bedard ................... 417/423.15 |
| 6,601,546 | B1 | * | 8/2003 | Mohr et al. .............. 123/41.49 |
| 2002/0090297 | A1 | * | 7/2002 | Kobayashi .................. 415/220 |

FOREIGN PATENT DOCUMENTS

| DE | 100 48 245 | 4/2002 |
| EP | 0 838 626 | 4/1998 |

* cited by examiner

*Primary Examiner*—Devon C Kramer
*Assistant Examiner*—Patrick Hamo
(74) *Attorney, Agent, or Firm*—Young & Thompson

(57) ABSTRACT

This ventilation assembly for a motor vehicle comprises a fan (3), a support (4) for mounting the fan (3) in a motor vehicle and a securement (24) of the fan to the mounting support (4), the fan comprising a helix (6) and a motor (8) for driving the helix (6) in rotation. The securement (24) comprising a collar (26) for the radial clamping of the motor (8). Application, for example, to the ventilation of the cooling radiators of the heat engines of motor vehicles.

4 Claims, 5 Drawing Sheets

VENTILATION ASSEMBLY HAVING A COLLAR FOR THE RADIAL CLAMPING OF THE FAN MOTOR, CORRESPONDING COOLING MODULE FOR THE FRONT UNIT, AND CORRESPONDING MOTOR VEHICLE

TECHNICAL FIELD

The present invention relates to a ventilation assembly for a motor vehicle, of the type comprising a fan, a support for mounting the fan in a motor vehicle and means for securing the fan to the mounting support, the fan comprising a helix and a motor for driving the helix in rotation.

BACKGROUND TO THE INVENTION

The invention is applicable in particular to the ventilation of heat exchangers placed in the front units of motor vehicles, for example to the ventilation of the cooling radiators of the heat engines of vehicles.

FR-2 766 235 describes an assembly of the above-mentioned type. The support there comprises a ring sector which receives the fan motor with radial clearance. The motor is secured to the support by means of screws extending through lugs which form an extension of the motor casing.

The securing of the motor to the support therefore requires the provision of securing lugs on the motor casing and, for each of the lugs, an operation of screwing and controlling the screwing torque applied.

The cost associated with the securing of the fan to the support is therefore relatively high.

An object of the invention is to solve that problem by providing an assembly of the above-mentioned type where the cost associated with securing the fan to its support is reduced.

SUMMARY OF THE INVENTION

To that end, the invention relates to an assembly of the above-mentioned type, characterised in that the securing means comprise a collar for the radial clamping of the motor.

According to particular embodiments, the assembly may comprise one or more of the following features taken in isolation or in any technically possible combination:

- the collar comprises at least two portions which are mobile relative to each other and means for causing the two mobile portions to approach each other;.
- the approach means comprise a screw;
- the approach means are means for approach by snapping-in;
- the approach means are an over-centre mechanism;
- the collar has a slot delimiting the two mobile portions;
- the clamping collar is integral with the support;.
- the securing means also comprise a wedging block which is to be inserted between the motor and the collar in order to clamp the motor radially;
- the collar is substantially rigid;
- the collar is fitted on the support and the support comprises flanges for bearing on the motor, which flanges are interposed between the clamping collar and the motor;
- the clamping collar comprises tensioning means;
- the tensioning means are an over-centre mechanism; and
- the clamping collar is a spring for the radial clamping of the motor.

The invention relates also to a front unit of a motor vehicle, comprising a heat exchanger and a ventilation assembly, characterised in that the ventilation assembly is an assembly as defined above.

The invention relates also to a motor vehicle, characterised in that it comprises a module as defined above.

BRIEF DESCRIPTION OF DRAWINGS

The invention will be better understood on reading the following description which is given purely by way of example with reference to the appended drawings in which.

DESCRIPTION OF PREFERRED EMBODIMENTS

Throughout the following, the orientations used are the usual orientations of a motor vehicle. In particular, the terms "front" and "rear" are to be understood relative to the position of the driver and to the direction of travel of the vehicle which is symbolised by the arrow F in FIG. 1.

Figure 1:
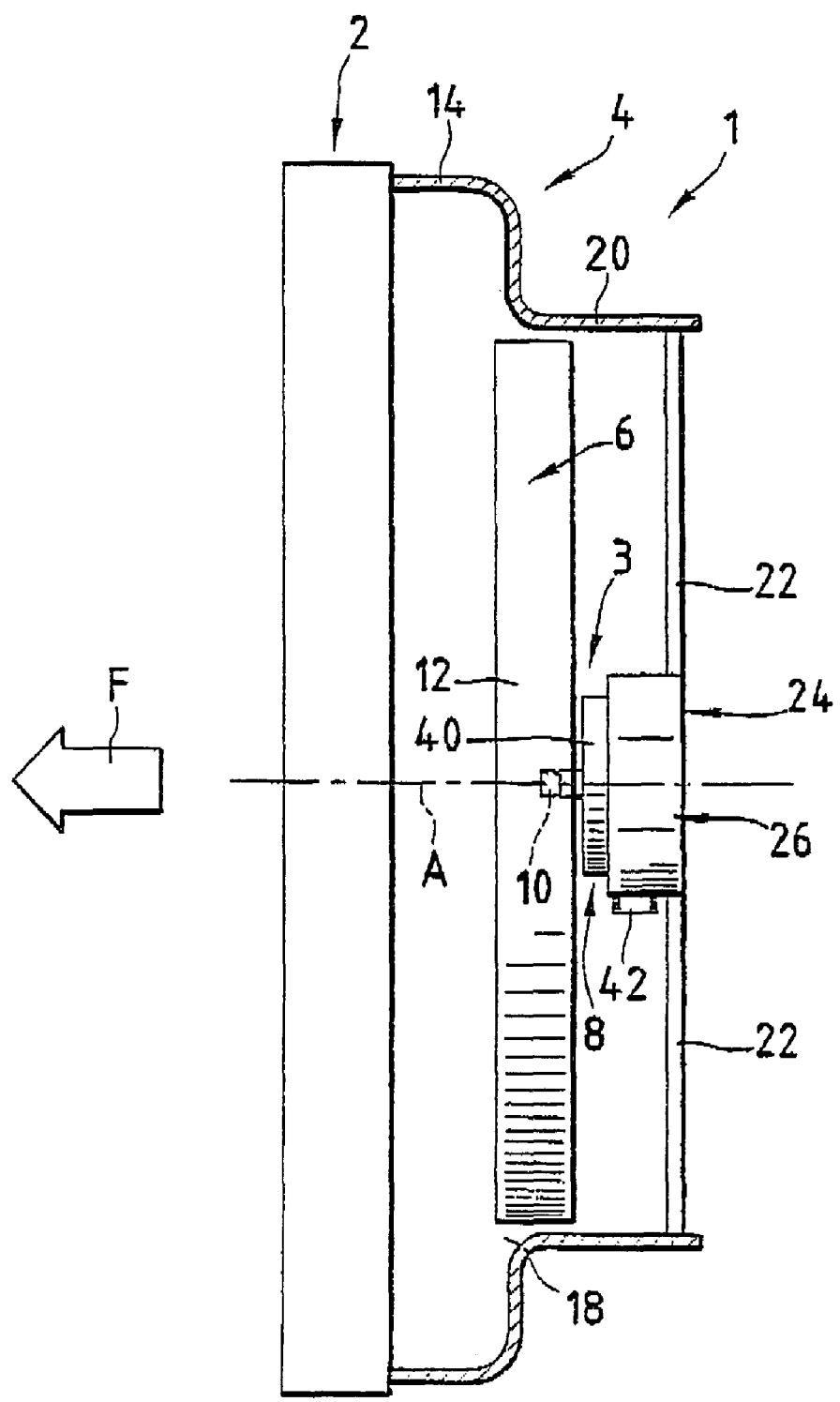
FIG. 1 is a partly sectioned lateral diagrammatic view of the cooling module of the front unit of a motor vehicle according to a first embodiment of the invention.

FIG. 1 illustrates a module 1 for cooling a front unit of a motor vehicle, comprising a heat exchanger 2, a fan 3 located behind the exchanger 2, and a support 4 for mounting the fan 3 on the heat exchanger 2.

The heat exchanger 2 is, for example, a radiator for cooling the heat engine of the motor vehicle. The heat exchanger 2 is typically of a generally parallelepipedal shape and of small thickness. The heat exchanger 2 is disposed substantially vertically and transversely to the direction of travel F. The heat exchanger 2 comprises, in a conventional manner, two cases for collecting a fluid for cooling the heat engine, a nest of tubes connecting those collecting cases, and, for example, fins extending between the tubes. The collecting cases are, for example, disposed laterally.

Since such a structure is conventional, the elements mentioned above have not been shown in FIG. 1.

The fan 3 comprises a helix 6 and an electrical motor 8, an output shaft 10 of which is connected to the helix 6 in order to drive it in rotation about its axis A which is substantially horizontal.

In a conventional manner, the helix 6 may comprise a central hub, by way of which it is connected to the output shaft 10, and blades which extend the hub radially outwards. The radially outer ends of the blades are, in the example shown, connected to one another by a circular collar 12. However, such a collar 12 does not have to be present.

The blades of the helix 6 are oriented to create a stream of air flowing towards the rear and therefore to suck in air through the heat exchanger 2. The fan 3 is therefore in a configuration generally referred to as the "sucking" configuration.

Conventionally, the fan 3 improves by forced convection the exchange of heat between the outside air and the heat engine cooling fluid circulating in the heat exchanger.

The support 4 comprises fairing 14 for channeling the stream of air created by the fan 3. The fairing covers the rear face of the heat exchanger 2.

Figure 2:
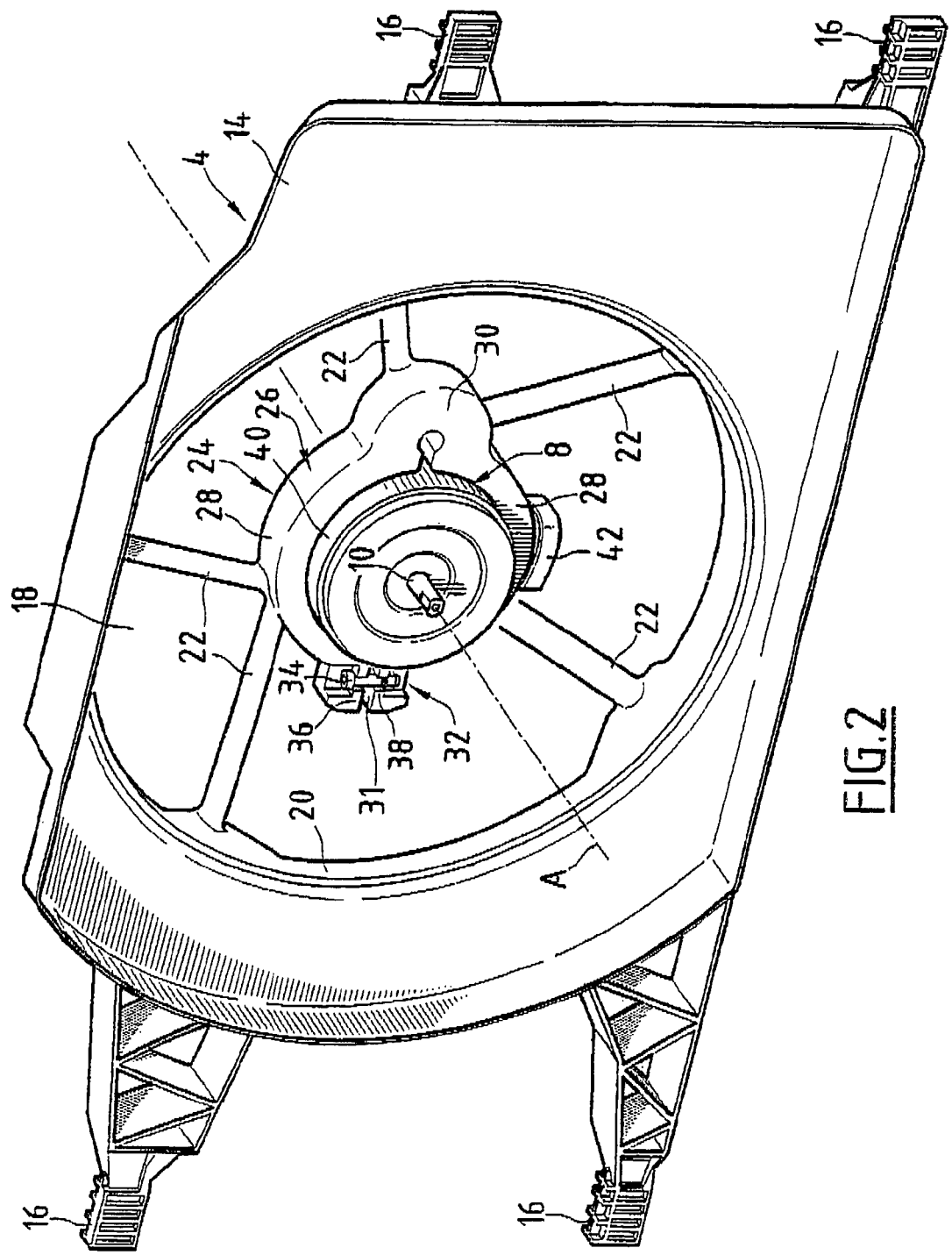
FIG. 2 is a perspective diagrammatic view, taken from the front, of the fan (helix not shown) and of the support of the fan of the cooling module of the front unit of FIG. 1.

As can be seen in FIG. 2, the fairing 14 is extended laterally on each side by two securing lugs 16 located one above the other.

Each lug 16 has been engaged, by vertical downward displacement, in receiving housings (not shown) provided on the collecting cases of the heat exchanger 2.

Thus, the support 4 is secured to the heat exchanger 2.

A circular central opening 18 is formed in the fairing 14. The fairing 14 is extended, around the opening 18, by a circular skirt 20 which extends towards the rear. The helix 6 is accommodated in the skirt 20.

The support 4 comprises arms 22 which extend from the skirt 20 towards the centre of the opening 18. The radially inner ends of the arms 22 are connected to means 24 for securing the fan 3 to the support 4.

The securing means 24 comprise a collar 26, two half-collars 28 of which are connected by a lateral articulation region 30. A slot 31 is provided on the opposite side to the articulation region 30 and delimits the two half-collars 28.

Owing to the articulation region 30, the two half-collars 28 are mobile relative to each other between a position in which they are spaced from each other and a position in which they have been caused to approach each other illustrated by FIG. 2. The fairing 14, the lugs 16, the arms 22 and the collar 26 are, for example, formed in one piece from plastics material.

The securing means 24 comprise, at right-angles to the slot 31, means 32 for causing the two half-collars 28 to approach each other. The means 32 comprise a bolt 34, the screw of which bears on a shoulder 36 fixedly joined to the upper half-collar 28, and the nut of which bears on a shoulder 38 fixedly joined to the lower half-collar 28.

The motor 8 is located in the collar 26 between the two half-collars 28, and the bolt 34 has been screwed up so that the half-collars 28 are in the position in which they have been caused to approach each other. The collar 26 then tightens on the lateral wall 40 of the casing or frame of the motor 8, on which wall it produces radial forces oriented towards the inside.

The motor 8 is thus secured axially and angularly relative to the support 4.

It will be appreciated that the lower half-collar 28 comprises an opening for receiving a connector 42 for the electrical connection of the motor 8 to a source of electrical power.

The securing of the fan 3 to the support 4 therefore requires only a single screwing operation and does not make it necessary for the casing of the motor 8 to be provided with securing lugs.

The costs associated with the securing of the fan 3 are therefore reduced.

If it is desired to secure a smaller motor 8 to the support 4 shown, it is possible to surround the lateral wall 40 of its casing with an adapter ring which would then be interposed between the collar 26 and the motor 8. The collar 26 would then exert its radial clamping forces directly on the adapter ring.

Figure 3:
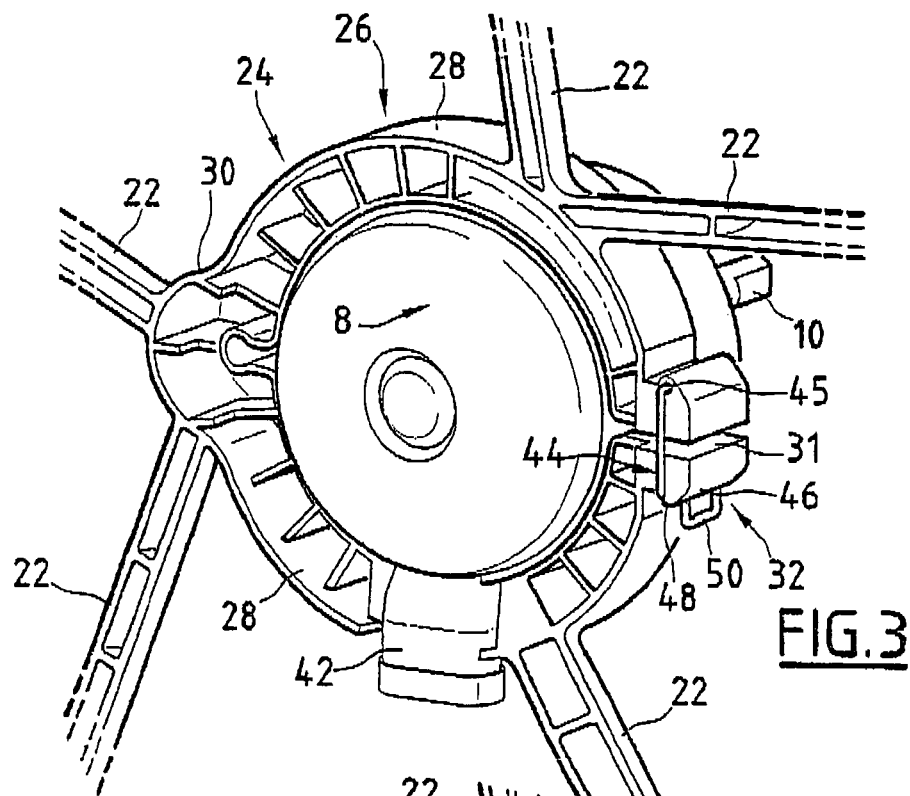
FIGS. 3 and 4 are enlarged perspective diagrammatic partial views taken from the rear, illustrating variants of the embodiment of FIGS. 1 and 2, FIGS. 5 and 6 are enlarged perspective diagrammatic partial views taken from the front, illustrating two variants of a second embodiment of the invention.

FIG. 3 illustrates a variant which is distinguished from the embodiment of FIGS. 1 and 2 by the nature of the approach means 32 which are means for approach by snapping-in.

The approach means 32 comprise a clip 44 articulated by an upper portion 45 to the upper half-collar 28. After passing onto a ramp surface 46, the lower region of the clip 44 is capable of engaging behind a retaining shoulder 48 fixedly joined to the lower half-collar 28. It is in that position that the clip 44 is represented in FIG. 3.

The clip 44 comprises a lower gripping portion 50 which enables the clip 44 to be freed from the shoulder 48 and to be moved away from the lower half-collar 28 by pivoting relative to the upper half-collar 28. The half-collars 28 then return resiliently to the position in which they are spaced from each other. In that position, the motor 8 can be inserted into or removed from the collar 26.

When the clip 44 is engaged behind the shoulder 48, the half-collars 28 are in the position in which they have been caused to approach each other. The collar 26 thus ensures radial clamping of the motor 8 which is secured in position relative to the support 4.

That variant does not require any screwing operation to secure the fan 3 to the support 4. The costs associated with the securing operation are therefore even further reduced.

Figure 4:
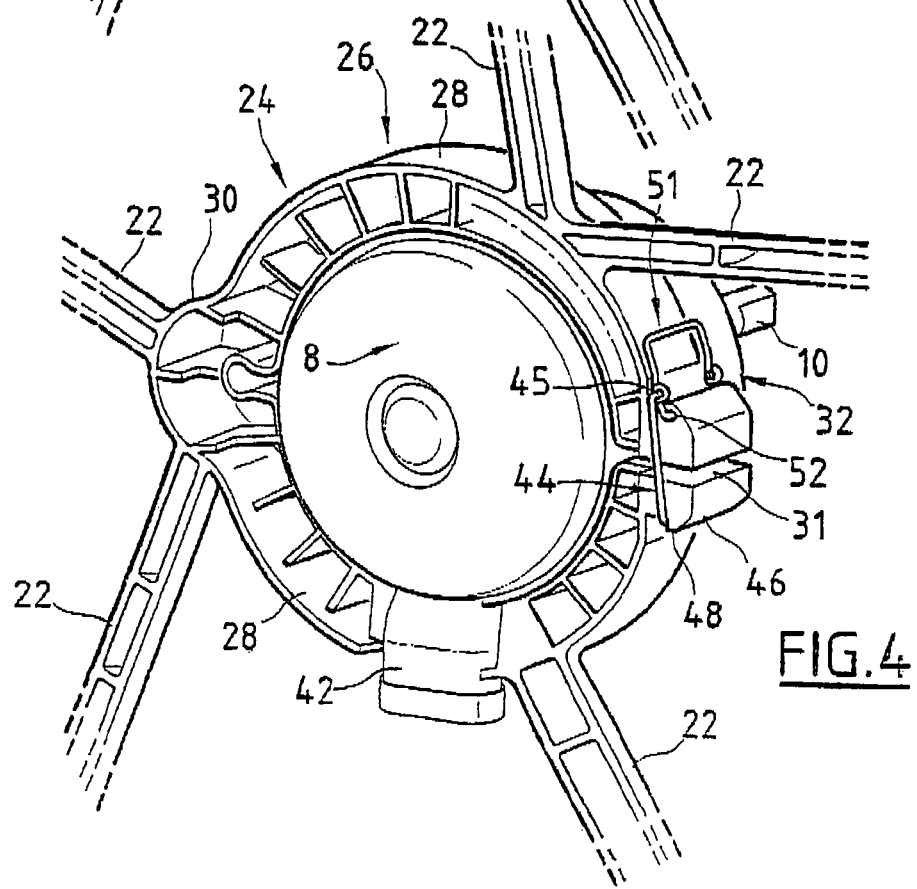

FIG. 4 illustrates another variant which is distinguished from that of FIG. 3 by the fact that the approach means 32 comprise an over-centre mechanism.

More precisely, the upper portion 45 of the clip 44 is then articulated to a control member 51 which is itself articulated by a lower portion 52 to the upper half-collar 28. The articulation portions 45 and 52 are spaced from each other so that the clip 44 and the control member 51 form an over-centre mechanism. The clip 44 no longer comprises a gripping region.

In the position represented in FIG. 4, the clip 44 is engaged behind the retaining shoulder 48 and keeps the half-collars 28 in the position in which they have been caused to approach each other. The collar 26 then clamps the motor 8 radially, ensuring that it is secured in position relative to the support 4.

In order to free the motor 8, the control member 51 is pivoted to the right in FIG. 4.

In the course of such a pivoting movement, the mechanism passes an over-centre position and it is then possible to disengage the clip 44 from the shoulder 48. The half-collars 28 then return resiliently to the position in which they are spaced from each other. The motor 8 can thus be removed. The insertion of the motor 8 into the collar 26 is also effected with the half-collars 28 in the position in which they are spaced apart from each other.

Figure 5:
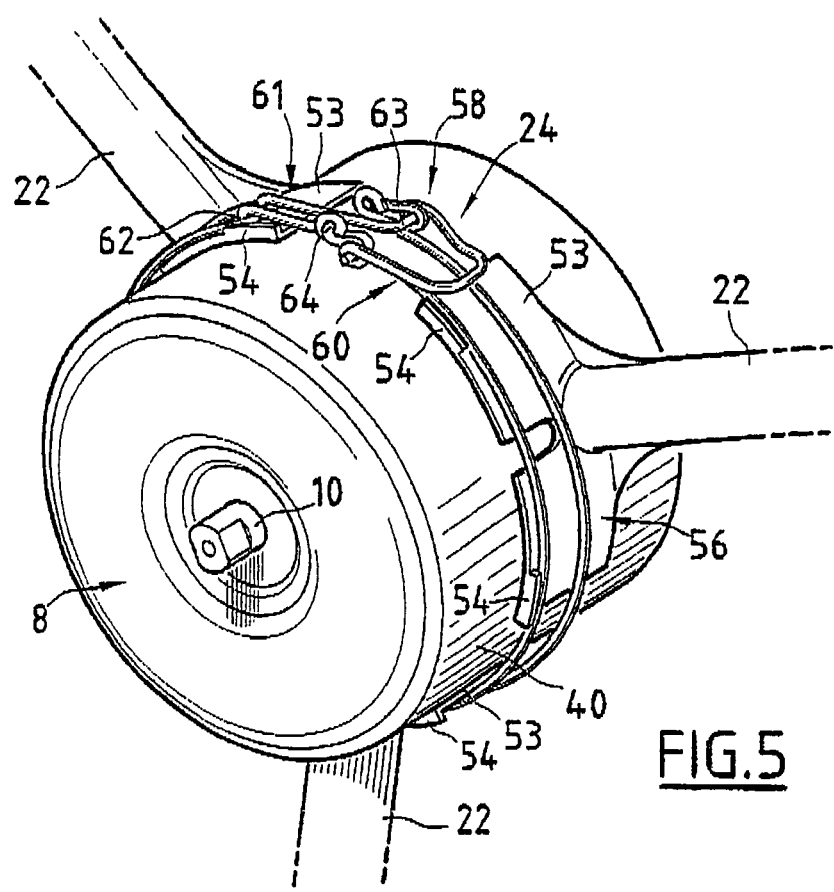

FIG. 5 illustrates a second embodiment of the invention.

In FIG. 5, only three arms 22 are shown instead of the five arms 22 in the previous Figures. However, the principles described hereinafter can be applied with a different number of arms 22.

Each arm 22 is extended by a flange 53 for bearing on the lateral wall 40 of the casing of the motor 8. The flange 53 is integral with the arm 22. The flanges 53 have the general shape of ring sectors.

The flanges 53 have front shoulders 54 projecting radially outwards. The flanges 53 are connected by their rear regions to the arms 22.

The means 24 for securing the motor 8 to the support 4 comprise, in addition to the flanges 53, a clamping collar 56, for example produced from metal wire, which surrounds the flanges 53 externally. The arms 22 and the shoulders 54 retain the collar 56 axially relative to the support 4.

The collar 56 comprises tensioning means 58. The means 58 are, in the example represented, an over-centre mechanism which comprises a control member 60 and a connecting member 61.

The connecting member 61 is articulated by a portion 62 to a first end of the collar 56 and by an opposite portion 63 to the control member 60. The control member 60 is articulated by a portion 64 to the other end of the collar 56. The articulation portions 63 and 64 are spaced from each other.

In the position illustrated by FIG. 5, the collar 56 is tensioned by the means 58 and exerts via the flanges 53 radial clamping forces on the lateral wall 40 of the motor 8, so that the motor 8 is secured in position relative to the support 4.

In order to free the motor 8, the control member 60 is pivoted upwards in FIG. 5. After passing an over-centre position, the collar 56 is no longer tensioned and the flanges 53 are no longer placed against the lateral wall 40 of the motor 8. The motor 8 can then be released.

The insertion of the motor 8 into the collar 56 is also effected with the collar 56 relaxed.

Tensioning means 58 other than an over-centre mechanism may be used, such as notched means.

Likewise, the collar 56 is not necessarily a collar of metal wire. It may be any other type of collar.

Figure 6:
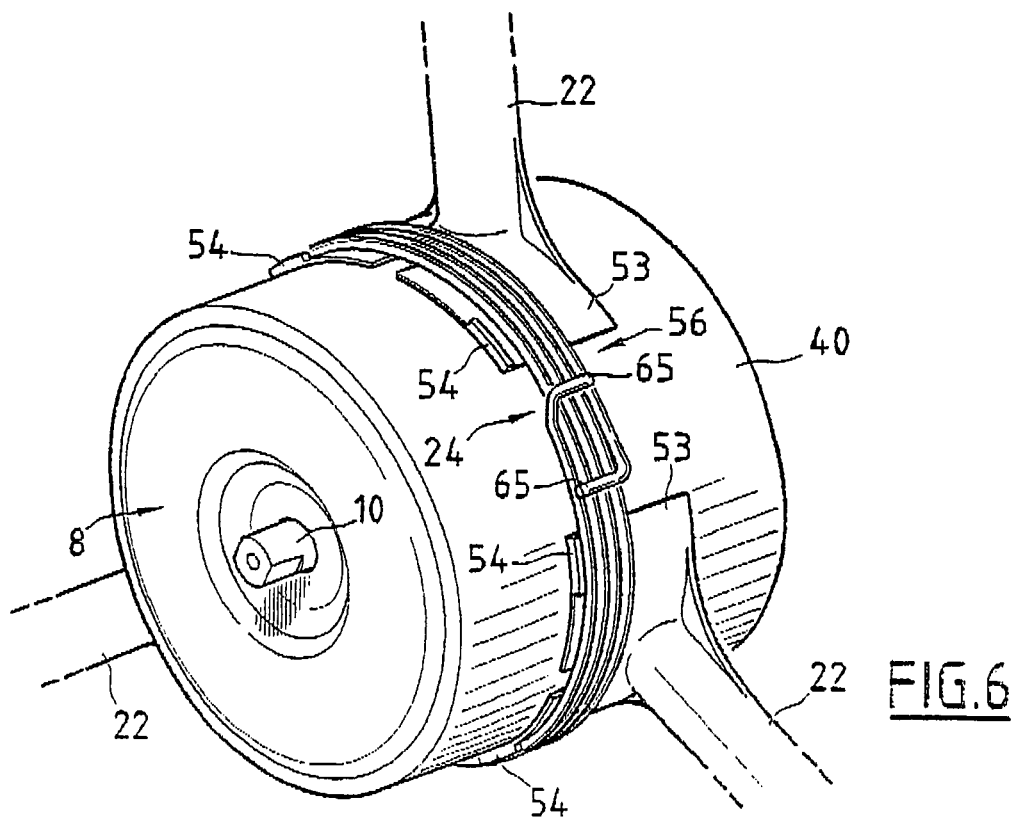

FIG. 6 illustrates, from another viewing angle, another variant of the second embodiment in which the collar 56 is constituted by a helical spring the two ends 65 of which are curved so that they can be gripped.

When the ends 65 are caused to approach each other against the resilient return action of the collar 56, the collar 56 relaxes and loosens its grip so that the motor 8 can be released from the collar 56 or inserted into it.

Conversely, when no force is applied to the ends 65, the collar 56 returns resiliently to the tensioned position and places the flanges 53 against the lateral wall 40 of the motor 8. The motor 8 is thus secured in position relative to the support 4.

Figure 7:
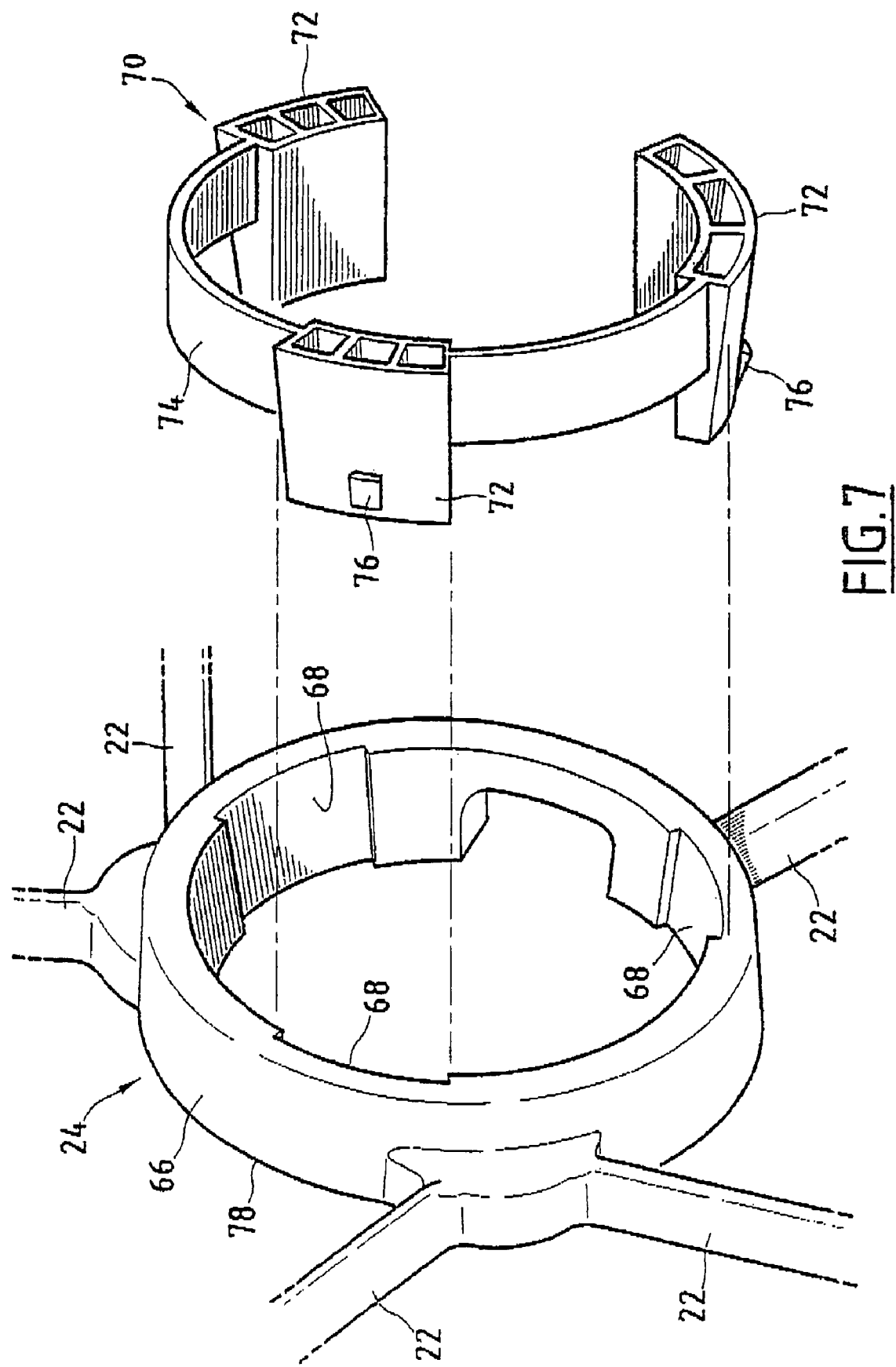
FIG. 7 is an exploded and enlarged perspective diagrammatic partial view taken from the-front and the top, illustrating a third embodiment of the invention.

FIG. 7 illustrates a third embodiment which is distinguished from that of FIG. 1 in that the means 24 for securing the motor 8 in position comprise a rigid circular collar 66 which connects the radially inner ends of the arms 22. Three grooves 68 are formed inside the collar 66. Those grooves 68 extend axially and are, for example, offset angularly by approximately 120° relative to one another.

The securing means 24 comprise, in addition to the clamping collar 66, a wedging block 70 which comprises three wedges 72 connected by-a band 74.

It will be appreciated that the band 74 does not extend between two wedges 72, so that a reduction in the diameter of the wedging block 70 at the moment of clamping, and the passage of the connector 42 for connecting the electrical motor 8 are permitted. It will be appreciated that the three grooves 68 are a little wider than the wedges 72 in order to permit clearance of the latter during clamping.

The wedges 72 have a converging form so that their radial thickness decreases from the front to the rear. The wedges 72 are provided with outwardly projecting snap-in fingers 76.

In order to secure the motor 8 to the support 4, the motor 8 is inserted into the collar 66 and then the block 70 is introduced axially by displacing it towards the rear. The wedges 72 then slide in the grooves 68 until the raised snap-in portions 76 engage behind the rear edge 78 of the collar 66. The block 70 is then retained-by the fingers 76 relative to the collar 66 against forward displacement. The collar 66 then clamps the lateral wall 40 of the motor 8 radially via the block 70.

The motor 8 is then fixed rigidly relative to the support 4. Rearward displacement of the block 70 would lead to even greater clamping of the motor 8 owing to the shape of the wedges. The securing in position of the motor 8 is therefore satisfactory.

More generally, the above principles may be applied to modules 1 for cooling front units in which the fan 3 is not in "sucking" configuration but in "blowing" configuration with the fan 3 located in front of the heat exchanger 2.

The invention claimed is:

1. A ventilation assembly for a motor vehicle, comprising a fan, a support for mounting the fan in a motor vehicle and means for securing the fan to the mounting support, the fan comprising a helix and a motor for driving the helix in rotation, the securing means comprising a collar for the radial clamping of the motor, wherein the collar is integral with the support, wherein the securing means also comprise a wedging block which is to be inserted between the motor and the collar in order to clamp the motor radially.

2. An assembly according to claim 1, wherein the collar is substantially rigid.

3. A module for cooling a front unit of a motor vehicle, comprising a heat exchanger and a ventilation assembly, the ventilation assembly comprising a fan, a support for mounting the fan in a motor vehicle and means for securing the fan to the mounting support, the fan comprising a helix and a motor for driving the helix in rotation, the securing means comprising a collar for the radial clamping of the motor, wherein the collar is integral with the support, wherein the securing means also comprise a wedging block which is to be inserted between the motor and the collar in order to clamp the motor radially.

4. A motor vehicle, including a module comprising a fan, a support for mounting the fan in a motor vehicle and means for securing the fan to the mounting support, the fan comprising a helix and a motor for driving the helix in rotation, the securing means comprising a collar for the radial clamping of the motor according to claim 3.

* * * * *